US008898315B2

(12) United States Patent
Litovski et al.

(10) Patent No.: US 8,898,315 B2
(45) Date of Patent: Nov. 25, 2014

(54) REMOTE ACCESS TO RESOURCES

(71) Applicant: ScanSafe Limited, San Jose, CA (US)

(72) Inventors: Ivan Litovski, London (GB); John Edwards, London (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/648,442

(22) Filed: Oct. 10, 2012

(65) Prior Publication Data

US 2013/0067098 A1 Mar. 14, 2013

Related U.S. Application Data

(62) Division of application No. 11/549,567, filed on Oct. 13, 2006, now Pat. No. 8,312,143.

(60) Provisional application No. 60/727,338, filed on Oct. 17, 2005.

(30) Foreign Application Priority Data

Oct. 13, 2005 (GB) .................................. 0520836.8

(51) Int. Cl.
*G06F 15/16* (2006.01)
*H04L 29/08* (2006.01)
*H04L 29/06* (2006.01)

(52) U.S. Cl.
CPC ................ *H04L 67/34* (2013.01); *H04L 67/14* (2013.01); *H04L 69/24* (2013.01); *H04L 63/0272* (2013.01); *H04L 63/0823* (2013.01)
USPC ......................................... 709/227; 709/238

(58) Field of Classification Search
USPC ......... 709/202, 203, 217, 219, 226, 227, 238, 709/239, 240, 241
See application file for complete search history.

(56) References Cited

U.S. PATENT DOCUMENTS

| 6,081,900 | A | 6/2000 | Subramaniam et al. |
| 6,754,621 | B1 | 6/2004 | Cunningham et al. |
| 7,693,107 | B2 * | 4/2010 | De Froment .................. 370/331 |

(Continued)

FOREIGN PATENT DOCUMENTS

| WO | 03094032 A1 | 11/2003 |
| WO | 2004015958 | 2/2004 |

OTHER PUBLICATIONS

Carli, et al., "Integrated Security Architecture for WLAN," IEEE, 2003, pp. 943-947.

*Primary Examiner* — Barbara Burgess

(57) ABSTRACT

The invention provides systems and for securely transmitting data between a roaming computer and a managed network service over a shared public network. A secure connection is created between the roaming computer and a server computer that hosts or acts as a secure gateway to the managed network service. The connection is set up and established by a client agent installed on the roaming computer and a connection component of the managed service on the server computer. The client agent and the connection component of the managed service operate, on an initial request from the roaming computer to the managed service to negotiate the secure connection using certificate-based client authentication. The client certificate preferably includes user-specific attributes that can be extracted by the connection component and made available to the managed service to apply processing rules specific to the user.

18 Claims, 2 Drawing Sheets

(56) References Cited

U.S. PATENT DOCUMENTS

| | | |
|---|---|---|
| 2003/0147537 A1* | 8/2003 | Jing et al. .................. 380/277 |
| 2003/0202479 A1 | 10/2003 | Huang et al. |
| 2004/0043791 A1* | 3/2004 | Reddy ........................ 455/558 |
| 2004/0136324 A1 | 7/2004 | Steinberg et al. |
| 2005/0055463 A1 | 3/2005 | Saunders et al. |
| 2005/0060411 A1* | 3/2005 | Coulombe et al. ............ 709/227 |
| 2005/0288015 A1* | 12/2005 | Azizi et al. .................. 455/434 |
| 2006/0098575 A1 | 5/2006 | Lee |
| 2006/0112188 A1* | 5/2006 | Albanese et al. ............. 709/238 |
| 2009/0204964 A1* | 8/2009 | Foley et al. .................. 718/1 |
| 2010/0095007 A1* | 4/2010 | Cherian et al. ............... 709/227 |

\* cited by examiner

REMOTE ACCESS TO RESOURCES

RELATED APPLICATIONS

This application is a divisional application of U.S. patent application Ser. No. 11/549,567 filed on Oct. 13, 2006, which is a utility patent application based on U.K. Patent Application No. 0520836.8 filed on Oct. 13, 2005, and U.S. Provisional Patent Application No. 60/727,338 filed on Oct. 17, 2005, the benefits of which are hereby claimed under 35 U.S.C. §119 and the disclosures of which are herein incorporated by reference in their entirety.

FIELD OF THE INVENTION

The present invention relates to systems and methods for enabling access from a roaming computer to resources accessible through a server computer located remotely from the roaming computer. It is particularly, although not exclusively, applicable to providing access to managed network processing services such as managed web services (e.g. web security services), mail processing services and IM (instant messaging') processing services.

BACKGROUND

Network processing services, such as web security services (e.g WebSense, SurfControl), mail processing services (e.g. Mailsweeper) or IM ("instant messaging") processing services (e.g. IMLogic, Facetime) are conventionally deployed within or at the perimeter of a corporate computer network. Operating within the corporate environment has several disadvantages, including the costs associated with installation and maintenance of the service and the hardware on which it runs. If the service is to remain current and up to date, regular upgrades are often needed, adding to these burdens associated with ownership.

The costs and other disadvantages associated with locally owned and hosted services have led to a growth in managed services provide by third parties, typically hosted off-site, communicating with the corporate network via an external network, very often an unsecured external network such as the Internet. Such managed services afford a multitude of benefits to users, including no installation or maintenance costs, regularly updated/upgraded service and generally more stable and faster processors running the service.

Particularly where the managed service is being hosted remotely and communicates with the corporate network via the Internet or other public network, as is often the case, it is generally important that the system is able to ensure that it only acts on requests received from valid users of the service. Typically, therefore, when a request is received by the managed service it will authenticate the request by checking the identity of the request originator.

The authentication may, for example, be based on a simple 'user name' and 'password' approach (e.g. "http proxy username" and "http proxy password" for http requests) but this is not particularly secure and is cumbersome to operate and administer. Consequently, the prevailing approach to authenticating users of managed services is an IP lockdown approach in which requests are only accepted from specific, predefined IP addresses. This approach has the benefit of being transparent to the user so long as they are accessing the managed service from a device having a static IP address that the service recognises (as would generally be the case, for example, if they were operating from their normal business premises).

However, it is becoming increasingly common for people to work away from their business premises (e.g. at home, at a customer's premises, in hotels when travelling and at other alternate locations). In many cases, such roaming users will be accessing corporate resources remotely, for example via a VPN, via a public network in circumstances where the device they are using has a dynamically assigned, and therefore variable IP address.

It is not possible for such roaming users to directly access managed network services that rely on IP lockdown to authenticate users. If the service is to be used, they must therefore resort to more cumbersome access via their corporate network through VPN, username/password authentication or, as is normally the case, simply not have access to the managed service when they are roaming. In those cases where access to a managed service is made available to a roaming user via a VPN, it is common that the roaming users choose whether or not to use the managed service.

Where the service is, for example, a managed web security service this might seriously compromise the overall security of the corporate network as remote users, who might well be connected to the corporate network, will be more vulnerable to attack.

There are a number of further drawbacks associated with such use of conventional VPN networks, such as the large number of manual and repetitive operations expected from users, expertise expected from users, cost of maintaining VPN, etc. Finally, VPN users may often experience increased latencies in network traffic because using VPN adds an unnecessary access to the corporate network, in order to use the managed service.

SUMMARY OF THE INVENTION

It is a general aim of the present invention to provide secure and transparent access to a managed network service for roaming users irrespective of their location. The invention provides various aspects that are useful towards meeting this aim, some of which are also useful in providing access to other resources accessible via a shared public network, including aspects relating to:

Certificate based client authentication to the managed service

Automation of tasks for minimal user interaction

Automated location dependent service routing

Automated cost based connection prioritisation

Service usage lockdown and tamper proofing

In a first aspect, the invention provides a system for securely transmitting data between a roaming computer and a managed network service over a shared public network, the system comprising:

a roaming computer;

a server computer connected to the roaming computer via the public network, the managed network service being accessible from the server computer;

a client agent installed on the roaming computer for creating a secure connection with the managed service and for transmitting data from the roaming computer to the managed service via the secure connection;

a connection component of the managed network service installed on the server computer for cooperating with the client agent to create said secure connection;

the client agent and the connection components of the managed service being operable, on an initial request from the roaming computer to the managed service to negotiate the secure connection using certificate based authentication.

In the first aspect above, and the second to fourth aspects below, the managed network service may be accessible from the server computer by being hosted by the server computer. Alternatively, the server computer may act as a secure gateway to the managed service.

In a second aspect, the invention provides a client system for a roaming computer for securely transmitting data from the roaming computer to a managed network service over a shared public network, the system comprising:
- a client agent installed on the roaming computer for creating a secure connection with the managed service and for transmitting data from the roaming computer to the managed service via the secure connection;
- the client agent being operable, on an initial request from the roaming computer to the managed service, to negotiate the secure connection using certificate based client authentication to the managed service.

In a third aspect, the invention provides a server system for receiving data from a roaming computer through a secure connection over a shared public network, the data being destined for a managed network service, the system comprising:
- a server computer connected to the roaming computer via the public network, the managed network service being accessible from the server computer;
- a connection component of the managed network service installed on the server computer for cooperating with a client agent installed on the roaming computer to create a secure connection between the roaming computer and the managed service and for enabling the transmission of data from the roaming computer to the managed service via the secure connection;
- the connection component of the managed service being operable, on an initial request from the roaming computer to the managed service, to negotiate the secure connection using certificate based client authentication.

In a fourth aspect, the invention provides a method for securely transmitting data between a roaming computer and a managed network service over a shared public network, the roaming computer having installed thereon a client agent and the managed network service comprising a connection component, the method comprising:
- the client agent and the connection component of the managed service operating, on an initial request from the roaming computer to the managed service, to negotiate a secure connection between the roaming agent and the managed service using certificate based client authentication; and
- the client agent transmitting data from the roaming computer to the managed service via the secure connection.

In the first to fourth aspects above, the certificate based client authentication will typically comprise the following steps:
1. Client initiates connection to "Connection Component"
2. Client and server perform standard SSL/TLS negotiation with certificate exchange
3. Connection Component verifies that client certificate is valid, preferably including:
   (a) is signed with a private key that is trusted by the Connection Component
   (b) is not contained within a certificate revocation list that is maintained by or accessible to the Connection Component.

The certificates may be long term (e.g. 1 week, 1 month, 1 year, etc) or short term (e.g. valid for a day or less, possibly just a few hours or may be as little as one hour or less).

Where long term certificates are used, a revocation list (i.e. a list of certificates that are now invalid even if they have not expired) is preferably maintained in the manner noted above. Where a revocation list is used, typically it must be maintained and distributed in various copies, e.g. across a managed service.

On the other hand, where short term certificates are used, the need for a revocation list may be removed. Instead, the client agent can poll a registration server periodically (preferably more frequently than the maximum duration of the short term certificate whilst the roaming computer is connected to the managed service). The registration server issues a new, short term certificate, assuming the roaming computer is still entitled to one. The entitlement of a roaming computer (or the signed in user for a session on any particular roaming computer) to a new certificate can be determined by the registration server, for example, by consulting an account database. The client agent can pass a "key" to the registration server to enable this. The "key" may, for example, be contained within the current short term certificate.

In accordance with preferred embodiments of the invention, the client certificate itself or an appendix to the certificate can be used to make available to the managed service information ("attributes") that the managed service can use when processing requests from the client. The information may be client specific, e.g. one or more of certificate ID, customer ID, username, validity dates, etc. The connection component can extract this information from the certificate or the certificate appendix and make it available to the managed service. For example, the customer ID and username may be used by the managed service to select and apply processing rules that are specific to a given customer and user.

The credentials need not be contained in the certificate. The may, for example, already be part of the communication.

In some embodiments, the credentials may be statically contained within the certificate. The static information may be the complete set of required credentials. Alternatively, the certificate may include a 'key' that enables the connection component, managed service or other downstream component to lookup additional credentials based on the key.

More generally, in the various aspects of the invention, user credentials or other information can be obtained (e.g. for user validation and/or as attributes for use by a managed service or other remote resource) in any of a number of possible ways. Examples include via a proxy agent, by connecting to an internal directory server (using a lookup based, for example, on user details obtained through a login script), via email self-service (e.g. validates email domain against domains configured for managed service and emails certificate), and via a credit card payment.

In the various aspects of the invention set forth above, it is preferred that the secure connection is established and managed in accordance with any one or more of the fifth to eleventh aspects set out below.

The following aspects are particularly useful in the context of connecting a roaming user to a managed network service. Preferably, therefore, the server computer referred to below hosts or otherwise provides access to a managed network service. However, the aspects below have wider applicability to accessing remote services more generally. For example, aspects of the invention can be used to securely connect a remotely located user to resources within a corporate network, potentially obviating the need for a conventional VPN.

In a fifth aspect, the present invention provides a system for securely transmitting data between a roaming computer and a server computer over a shared public network, the system comprising:

a roaming computer;

a server computer connected to the roaming computer by a shared public network; and a client agent installed on the roaming computer for creating a secure connection with the server computer over the public network and transmitting data from the roaming computer to the server computer via the secure connection;

the client agent comprising or being capable of receiving instructions from a resource manager component that can automatically select one from two or more predefined network routes for the transport of data from the roaming computer to the server computer via the secure connection, the route selection being performed by the routing manager on the basis of predefined rules.

In this way, an automatic and dynamic route selection and failover capability that can be transparent to the user of the roaming computer is inbuilt. If one of the possible routes is unavailable (either because the roaming user is not in a location which offers such a route, or because a normally available route has become unavailable for some other reason), the resource manager selects another available route without the need for any user input. Only if none of the predefined routes are available (or if the predefined list contains no entries whatsoever) will the client agent need to alert the user that there is a problem. The client agent provides the user with simple means of configuring additional usable routes in this circumstance. In the case of web access, the client agent can streamline the addition of new routes by displaying a configuration form directly within the web browser.

In a sixth aspect, the invention provides a client system for a roaming computer for securely sending data from the roaming computer to a server computer over a shared public network, the client system comprising:

a client agent installed on the roaming computer for creating a secure connection with the server computer and transmitting data from the roaming computer to the server computer via the secure connection;

the client agent comprising or being capable of receiving instructions from a resource manager component that can automatically select one from two or more predefined network routes for the transport of a request from the roaming computer to the server computer via the secure connection, the route selection being performed by the routing manager on the basis of predefined rules.

In a seventh aspect, the invention provides a method for securely sending data from a roaming computer to a server computer over a shared public network, the roaming computer having installed thereon a client agent comprising or receiving instructions from a resource manager, the method comprising:

the client agent creating a secure connection between the roaming computer and the server computer over the public network;

the resource manager automatically selecting one from two or more predefined network routes for the transport of a request from the roaming computer to the server computer via the secure connection, the route selection being performed based on predefined rules; and the client agent sending a request from the roaming computer to the server computer via the secure connection using the selected route.

The resource manager may be located at the client, for example be comprised in the client agent. On the other hand, the resource manager may be located server side, the route selection being made by the server-side resource manager, which then instructs the client agent which route to use. Alternatively, the function of the resource manager may be distributed between client and server sides of the system.

The predefined route selection rules may be static or dynamically generated. In the case of dynamically generated rules they can be 'predefined' in the sense that they are dynamically generated in accordance with predefined criteria.

The (static or dynamic) predefined rules may include rules based on the location of the roaming computer. For example, some network routes may only be available from certain locations (the user's home, particular client sites, etc). In some embodiments of the invention, the resource manager maintains (or has access to) discrete lists of possible network routes for each of a number of possible roaming computer locations.

Preferably, for each roaming computer location, there are at least two predefined routes (each of which may or may not be common to other of the locations).

The route selection rules may also include a prioritisation, a priority being assigned to each route on the basis of factors such as cost and typical usage (e.g. usually used at work, only rarely at home) or based on prior configuration.

Route prioritisation may take account of network connection types. For example, where there is more than one active network connected to the roaming computer it may be preferable to force the secure connection to be made over only one of these network connections (preventing "dual-homing"). Where a connection is available via an Ethernet port, this will normally be preferred. It may be desirable to actively disable other connections (e.g. using an NDIS or WMI query).

The prioritisation of routes may also take into account performance measures (e.g. speed of connection). The performance measures may be determined periodically or dynamically when needed.

The route prioritisation could be determined purely by the client side components. Alternatively, the prioritisation (or other aspects of the route selection rules) can be determined server side and passed to the resource manager. Where prioritisation is determined server side, performance metrics are preferably gathered at the client side and sent to the server side component to be used when determining the priority for any particular route.

The selection of route must also take into account the availability of any particular route. For instance, at any point in time, one or more of the routes that are theoretically available for communication between the roaming computer and server computer may be unavailable as a result of a fault or routine network maintenance for example. The resource manager can determine the availability of each route on a trial an error basis each time a request is to be sent, but more preferably the resource manager maintains (or has access to) state information for one or more, preferably all, of the possible routes. The state information can be used to determine whether any particular route is currently available and, if it is not, the resource manager will select an alternative route (or if not alternative route is available, inform the user accordingly). Preferably the state information is updated frequently.

In general, therefore, in preferred embodiments of these aspects of the invention, the resource manager will select the route to be used by determining which of the possible routes from a given location of the roaming computer are currently available and, of the available routes, select the route with the highest priority assigned to it (the prioritisation being based on various factors including, for example, performance criteria).

In an eighth aspect, the invention provides a system for securely transmitting data between a roaming computer and a server computer over a shared public network, the system comprising:

a roaming computer;

a server computer connected to the roaming computer via the public network;

a client agent installed on the roaming computer for creating a secure connection with the server computer and transmitting data from the roaming computer to the server computer via the secure connection;

a server component installed on the server computer for receiving data from the client agent sent via the secure connection;

the client agent operating, on initiation of the secure connection, to open a communication channel through the secure connection and designate it as a control channel, the control channel being used by the client agent to open a further one or more communication channels for transmission of data through the secure connection;

the client agent comprising a multiplexer component for combining data from the control channel and said one or more further communication channels into a single data stream for transmission through the secure connection; and the server component comprising a de-multiplexer component for receiving the single data stream and de-multiplexing it to recreate the distinct control channel and one or more further communications channels.

In this way, multiple secure channels of communication can be established between the roaming computer and the server computer, whilst only having to complete the negotiations needed to set up the security of the communication channels once (when the secure connection is first initiated).

In a ninth aspect the invention provides a client system for a roaming computer for securely transmitting data from the roaming computer to a server computer over a shared public network, the system comprising:

a client agent installed on the roaming computer for creating a secure connection with the server computer and transmitting data from the roaming computer to the server computer via the secure connection;

the client agent operating, on initiation of the secure connection, to open a communication channel through the secure connection and designate it as a control channel, the control channel being used by the client agent to open a further one or more communication channels for transmission of data through the secure connection;

the client agent comprising a multiplexer component for combining data from the control channel and said one or more further communication channels into a single data stream for transmission through the secure connection.

In a tenth aspect the invention provides a server system for receiving data transmitted securely from a roaming computer over secure connection created over a shared public network, the secure connection comprising a communication channel designated as a control channel, the system comprising:

a server component installed on the server computer for receiving data from the roaming computer sent via the secure connection;

the server component comprising a de-multiplexer component for receiving a multiplexed data stream from the roaming computer sent via the secure connection and separating the de-multiplexing the signal to recreate the distinct control channel and one or more further communications channels carrying the data from the roaming computer.

In an eleventh aspect the invention provides a method for securely transmitting data between a roaming computer and a server computer over a shared public network, the roaming computer having a client agent installed thereon and the server computer having a server component installed thereon, the method comprising:

the client agent creating a secure connection with the server computer;

the client agent, on initiation of the secure connection, opening a communication channel through the secure connection and designating it as a control channel, the client agent, using the control channel, opening a further one or more communication channels for transmission of data through the secure connection;

the client agent multiplexing data from the control channel and said one or more further communication channels into a single data stream for transmission through the secure connection;

the client agent transmitting the single data stream to the server computer via the secure connection;

the server component receiving the single data channel sent via the secure connection; and the server component de-multiplexing the single data stream to recreate the distinct control channel and the one or more further communications channels.

Typically, the multiplexed communication through the secure connection will be bi-directional, both the client agent and server component comprising multiplexer and de-multiplexer components to facilitate this. A single control channel that both the server component and client agent can use to open channels is preferred.

The control channel preferably remains open throughout a session. It can be used, in preferred embodiments, by both the client agent and the server component to open and close communication channels and to manage the data transfer.

One example of management of the data transfer is controlling the transfer speed. This may be desirable, for example, where the data for transmission through a communication channel is being produced at a higher rate than it is being consumed at the other endpoint of the channel. If left unchecked, this may results in an unacceptable amount of data in a queue at the consumer endpoint. Preferably, therefore, control signals are generated at the data consumer end of the communication channel, and transmitted to the data producer end of the communication channel (preferably through the separate control channel) to control the speed of data transmission through the channel.

If the client agent or server component request that a communication channel is closed before data transmission is complete, the channel is preferably kept open until transmission is complete and then closed.

In the various aspects of the invention above, the secure connection between the roaming computer and the server computer is preferably an SSL/TSL connection.

The public network over which data is transmitted may be the Internet. The data transmission route between the roaming computer and the server computer/managed network service may include other networks in addition to the public network, e.g. corporate networks, wireless hot spots, etc.

The roaming computer may be any of a number of suitable types of digital processing device that can be connected to a shared public network, including (for example) general purpose computers such as desktop PCs, laptop PCs, tablet PCs and handheld PCs, personal digital assistants (PDAs), portable telephones (e.g. cellular telephones and satellite telephones) and games consoles. In some cases the roaming computer may be a dedicated device, for example a gateway device or a proxy server, which may be in or at the edge of a corporate network.

In many applications envisaged for various aspects of the present invention the roaming computer will be located outside of a corporate network. Conveniently, however, particularly (although not necessarily exclusively) where implemented for roaming computers outside the corporate network, aspects of the present invention can also be used for connecting users within a corporate network to a remote resource, e.g. a managed service. In this case, the roaming computer of the various aspects set out above is preferably a gateway device through which client devices (e.g. PCs) connected to the corporate network can access the remote service.

The various aspects of the invention may be implemented in a number of ways, for example they may be deployed as a local proxy, as a local application level gateway/router, in a firewall or as an application plugin (e.g. as a browser helper object—'BHO').

As noted above, various aspects of the invention can, in some cases, conveniently be used to obviate the need for a separate VPN connection to a corporate network. In some cases, however, it may be desirable to allow a separate VPN connection to co-exist alongside a connection created in accordance with aspects of the present invention. In these circumstances, the client agent of aspects of the present invention is preferably capable of managing traffic from the client device in one or more of the following ways:

- traffic determined to be for the managed service (or other remote resource to which the client agent provides as secure connection), such as web, IM, P2P or VOIP for example, is directed via the secure connection established by the client agent;
- corporate traffic, e.g. access to a corporate mail server (or other resource within the corporate network) is directed via the corporate VPN;
- 'Forbidden' traffic (i.e. traffic of certain pre-defined types or destined for pre-defined forbidden destinations) is preferably blocked within the client; and
- 'Allowed' traffic allowed to pass directly.

This switching/routing configuration is preferably locked down at the client and controllable by an administrator. Preferably the administrator control can be achieved remotely, e.g. centrally, for instance as part of a more general managed network service control portal.

The client agent may also be configured to switch to a non-secure mode (i.e. not using the secure connection) when it detects itself to be inside the corporate network.

The invention also provides software code for implementing the various aspects of the invention set forth above when installed on a computer or a computer network.

BRIEF DESCRIPTION OF THE DRAWINGS

Embodiments of the invention are described below, by way of example, with reference to the accompanying drawings, in which.

DETAILED DESCRIPTION

The embodiment of the invention described below with reference to FIGS. 1 and 2 can be used to provide a managed network service to off-site users, such as employees working at home, a client site or other alternate locations. This is achieved using a software system that enables reliable and transparent service for such users.

Figure 1:
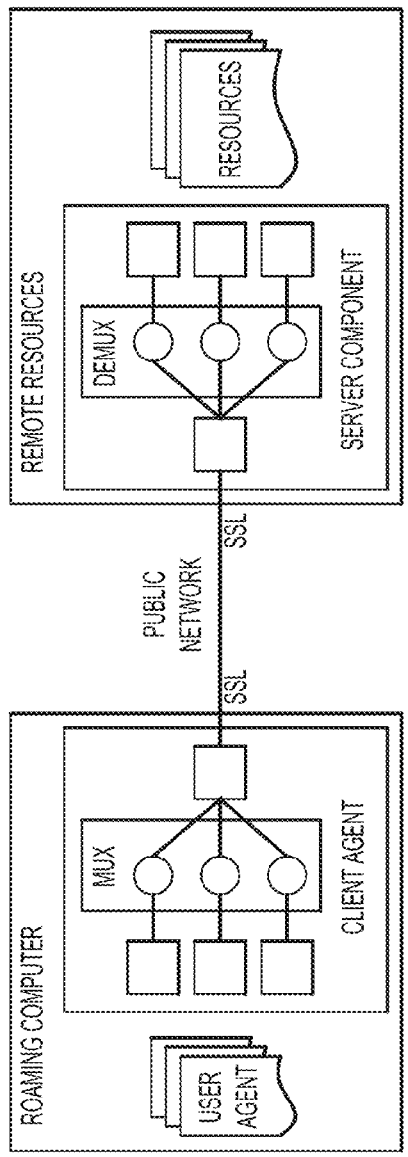
FIG. 1 is a schematic illustration of a system for providing a roaming computer with access to remote resources in accordance with an embodiment of the present invention.
Figure 2:
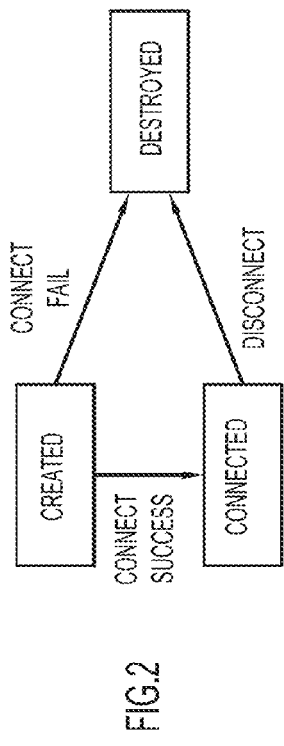
FIG. 2 shows a channel state machine for controlling a channel life cycle of a communications channel in the system of FIG. 1.

Referring to FIG. 1, the system comprises two principal components: a client agent that is installed on an authorised user's roaming computer; and a server component that is installed on a server computer located remotely from the roaming computer (for example at business premises of the user's company or, more likely at the premises of a third party supplier of the managed service). The server computer hosts the managed network service or acts as a gateway to a secure network in which a separate server hosts the service. The user's roaming computer may be located at any of a number of different locations, including the user's home, customer premises and other locations remote from the server computer. The only requirement is that the roaming computer can connect to a public network such as the Internet.

As explained in more detail below, a single secure (SSL) connection is created between the client agent and the server component, over the Internet (or other public network), using certificate-based authentication, similarly to a normal VPN connection. This connection is made via one of a number of possible, predefined upstream routes. The specific route through which the connection is made is determined by a resource manager component of the client agent, without the need for user involvement, based on the availability of the routes and a priority order that for each route can be pre-assigned or determined dynamically by the resource manager, as discussed further below.

Once the initial secure connection is established it serves as a first secure channel of communication between the client agent and the server component. This first communications channel is not itself used for handling requests for remote resources from the various user agents (applications, etc) running on the roaming computer. Instead, it is reserved as a control channel for the handling of control messages between endpoints of the secure connection at the client agent and server component.

In response to requests from the roaming computer for resources available via the server component, the client agent (using the control channel) establishes a further communication channel, separate from the control channel, between the client agent and the server component, to handle the request. The data carried on this further channel is combined with data carried by the control channel by a multiplexer component of the client agent, to form a single data stream that is transmitted through the single secure (SSL) connection between the client agent and server component.

The server component has a corresponding de-multiplexer component that splits the data stream into the separate communications channels once more, so that the request can be dealt with by respective resources.

Requests or responses transported from the server component to the client agent are treated in the same way, the data from the multiple communications being multiplexed at the server component, transmitted as a single data stream over the secure connection and de-multiplexed by the client agent.

Subsequent requests/response from/to the roaming computer are handled in the same way, with further multiplexed communications channels being created as needed.

In this way, multiple connections between the roaming computer and remote resources can in effect be created whilst only having the complete the SSL negotiations once, all of the communications channels being tunnelled through the single secure connection.

Various features of the system shown in FIG. 1 are discussed in more detail below.

Installation

At the time of installation of the "client agent" on the "roaming computer", user credentials are obtained and transmitted securely to a dedicated "registration" server (not shown). The "registration" server provides the client thereafter with initial configuration (e.g. access server addresses) and credentials for accessing the servers (e.g. X509 certificates).

The installation process can subsequently perform other steps to prepare the computer for roaming if needs be.

Finally, the desired service is directed towards the "client agent". For example, for redirecting web browsing, this may mean setting the web browser's proxy settings to point to "client agent".

Certificate Generation and Distribution.

The client certificate can contain a variety of information that has functional value to the provider of the managed service, for example:
  Customer id
  User name and other directory information (e.g. group membership, telephone, etc.)
  Certificate id, creation and expiry date The key requirement for the certificate is that the information contained within it can be trusted by the Connection Component. This is achieved using standard certificate signing techniques.

The preferred method of certificate generation is to use the "registration server" in conjunction with a "Network Agent" in the manner described below. The "Network Agent" preferably operates in accordance with the invention described in our earlier UK patent application no. 0519466.7 to append local network (e.g. corporate network) information to network communications in order that this information can be made available to remote resources that do not themselves have direct access to the local information.

The preferred method of certificate generation is as follows:
  The Client Agent is installed when the client (roaming) computer is connected to a network that is also running the Network Agent. The Client Agent is configured to use the Network Agent as its preferred route when available.
  The client agent makes an initial request to the registration server, which passes through the Network Agent. The Network Agent adds a secure message appendix to the request, the appendix including details that can be used subsequently to uniquely identify the client e.g. username, group membership, etc.
  The registration server is able to trust the request because a) the message appendix was signed by the Network Agent, and b) the registration request originated from a known IP address. The registration server echos back the message appendix to the Client Agent.
  The Client Agent then uses this appendix to request a certificate from the Registration Server. It may also include license key details which were entered as part of the Client Agent install process. Alternatively all licensing details may be maintained centrally.
  The Registration Server generates a certificate with a unique ID and containing the details from the message appendix, such as customer and user identification. This information is stored in the certificate's 'Subject' field. Details of the certificate are recorded and may be used for subsequent audit or revocation. The certificate is signed by the managed service private key or intermediate and then returned to the client agent.
  The Client Agent installs the certificate The Registration server and connection component share a predetermined format for storing and retrieving user information from certificates Subject field. One such format may be as follows:
  The "Common Name" (CN) section of the subject contains user identification (name or ID)
  The "Organisational Unit" (OU) section of the contains identification of groups (name or ID) the user belongs to within his organisation (e.g. sales, accounts)
  The "Organisation" (O) field contains customer identification (company name or ID).
  The "Country" (C) field contains the base region or country identification
  Some or all fields in the Subject may be encrypted.

There are numerous other alternative methods of certificate generation, which are all equally valid provided that the end result is a certificate that can be trusted and that contains sufficient information to enable the Managed Service to operate.

For example, in another embodiment, certificate generation can occur within the Network Agent directly, using an intermediate CA that was allocated to the customer at an earlier time.

In another embodiment, the Client Agent does not require connection to a separate Network Agent in order to automatically obtain username and directory information, but instead includes the necessary functionality to do this autonomously.

For example, a potential remote user could visit the Managed Service website, enter payment details, then receive a certificate with a preset validity and automatically generated identifier.

Tamper Proofing

As outlined above, it is common that a security lapse may come from users deliberately bypassing security mechanisms. In particular, a user may deliberately decide to not use managed web protection. To protect against this, the client application ensures that the service is being used. For example in the case of managed web security service, the client forces proxy settings for all users and all installed browsers so that managed service is used. Also, the client may periodically verify that these settings are not modified, and if they are, such change may be logged and reverted automatically.

Transparency and Failover Capability

The client agent manages several upstream routes that are capable of handling requests.

These routes are provided to the client agent by the server during installation and are not necessarily visible to the user, during installation or during normal use.

The upstream routes are configured in such a way that:
  a) There are separate route settings for typical user locations (e.g. at work, at home, at a third party site)
  b) For each typical user location (e.g. at home, at work), there are multiple available settings (e.g. dual servers)

c) Routes are prioritised. Prioritisation criteria may be cost, typical usage (e.g. usually used at work, only rarely at home) or based on prior configuration.

Resource Management Algorithm

The client agent views the upstream routes as resources. These resources (i.e. upstream routes) are managed by a resource manager within the client agent. The resource manager passes requests to resources and maintains resource state (e.g. availability, cost).

Handling Requests

At first, the resource manager assumes that all registered resources are available. If a resource fails to handle a request, the resource manager passes the request onto the next available resource. If all resources fail to handle the request, the user is presented with reasons for failure and offered help, configuration options and a facility to retry the original request.

Resource State Monitoring

In this example, resource state monitoring is a passive asynchronous process. There are two ways the resource manager can establish resource state:

The resource manager can periodically issue requests to a resource (polling); or For a resource that can determine its own state, polling may not be necessary, and the resource can asynchronously notify the resource manager of state changes.

Further variations to these two principles may be used. For example, polling is often considered an expensive operation because it is a continuously repetitive operation, especially in battery powered devices. To overcome this issue, the resource manager may use resource polling only for resources that cannot determine their own state, and/or only on start-up and when the resource is known to be unavailable.

When a resource fails, the resource manager starts a separate, asynchronous procedure to manage failed resource as follows. Each resource provides a "test signal" to the resource manager. After the initial failure, the resource manager will keep testing the resource asynchronously using the resource's declared test signal. After a resource fails a specified number of times (F), the resource is flagged as unavailable and a polling thread is started.

The unavailable resource is polled using the following algorithm. Following a single resource request, the resource is polled N number of times and with a period T. If there are no requests during that time, polling ends. If, however, resource requests occur while polling, polling continues with the same period T. Polling continues until there have been exactly N polls after the last resource request, again with the period T. After this period, it is assumed that the physical user (e.g. a human) no longer needs the resource and polling ceases, preserving system resources (e.g. CPU usage, battery). If the user resumes requesting resources, polling will again resume as above.

Once the polling requests begin succeeding for a resource (RES), after a number S of successes the resource manager performs following tasks:

Stops the asynchronous polling process for resource RES

Establishes cost for using resource RES

Determines the priority for the resource RES (based on location, cost etc)

Makes resource RES available for handling requests.

Transparency and Failover Resilience

Using the above approach, the resource manager maintains up to date information on resource availability.

When the user issues a request, it is routed to resources according to:
1. Availability
2. Priority The user is not necessarily aware which resource is handling the request. The user does not need to perform any action if one resource becomes unavailable, as the request is routed to the next available resource without any user intervention.

If the user changes location to a location where a currently used resource is unavailable, the resource manager detects the change in resource availability and selects a different, currently available resource.

In this way, the user experiences transparent service without interruptions.

Similarly, the above algorithm performs well in case of resource failure (for example, link failure or maintenance). As long as there is a single resource capable of handling requests, the user does not experience any service interruption.

Eliminating the Cost of SSL Negotiation

The SSL negotiation while establishing a connection, including certificate-based authentication of clients and servers, are intrinsic parts of the SSL standards. Therefore, this negotiation must occur if SSL based communication is used.

The embodiment of the invention shown in FIG. 1 offers a mechanism to enable the above-mentioned negotiation to occur only once for multiple secure communication channels.

The way this is achieved is that once an initial connection is established, it is not provided to the client as a resource. Rather, it is used as a generic communication channel through which multiple connections can be maintained by multiplexing and de-multiplexing data packets on both sides of the communication channel. This in effect produces an unlimited number of communication channels tunnelled through a single SSL connection.

As the initially established SSL connection is secure (authenticated and protected by encryption), the tunnelled connections are also secure and do not require additional, lengthy negotiation when they are subsequently established.

Multiplexing Connections

Each side of the established connection will be referred to as a connection endpoint. Each connection endpoint provides multiplexing and de-multiplexing service effectively providing logical channels.

For example, this functionality may be provided as an Application Programming Interface (API) that mimics the programming language's connectivity implementation. For example, if the language of choice is the Java programming language, the API provides custom implementations of SocketFactory and Socket classes.

Packets

The data is transferred between the two endpoints in the form of data packets. Table 1 below shows a typical data packet format.

TABLE 1 typical data packet format

| Name | Type (typical) | Description |
| --- | --- | --- |
| Channel ID | 64 bit, 32 bit, 16 bit | The identification number for current logical channel |
| Packet type | 8 bit | CONTROL, DATA or KEEP_ALIVE |
| Data length | 32 bit, 16 bit | Length of the data section of this packet |
| Data | * | Actual data |

Combining Packets into a Data Stream

Packets posted from multiple channels are combined into a data stream. Writing packets to the connection data stream may be synchronous (i.e. no write queue) or asynchronous (i.e. using write queue).

Writing a packet to the data stream is an atomic operation, i.e. while a packet is being written all pending further packets are waiting for current write operation to complete. Only when the current packet is written, does writing of the next packet commence.

The decision as to which packet is the next one to write (either in synchronous or asynchronous mode) may be taken based on predetermined prioritisation criteria. For example, the control channel may be assigned higher priority than data channels.

The nature of the underlying connection is that it guarantees that packets written in this way will appear on the opposite endpoint in the exact same order.

Channels

The connection can comprise multiple channels. The channels are uniquely identified, for example using a 32-bit channel-id value. Conveniently, the channel with channel-id value of 0 can be designated as the control-channel.

Each endpoint maintains a channel-table for open channels.

Channel Lifecycle

The control channel is always assumed open. All other channels are maintained according to a finite state machine. For example, a simple multiplexing connection may use the channel state machine shown in FIG. 2.

Control Channel

The control channel allows endpoints to exchange control messages. An example control message set is shown in Table 2 below.

Control commands are transported as packets in the control channel. Each command has a request-id that allows it to track any responses. Commands have additional syntax for command parameters that are transported in the data section of the packet. For example, the CONNECT command may request a particular channel-id for the channel it is attempting to establish.

TABLE 2

Control Message Set for Control Channel

| Command | Description |
| --- | --- |
| CONNECT | Open a new channel |
| DROP | Close an existing channel |
| CONNECT_RESPONSE | Acknowledges that a new channel was open to the requesting endpoint |
| DROP_RESPONSE | Acknowledges that a channel was closed to the requesting endpoint |
| SLOWDOWN | Inform the opposite endpoint to lower its data rate for a particular channel |
| STOP | Inform the opposite endpoint that the number of unprocessed packets for a channel exceeds configured maximum |

Common Operations—Establishing a New Channel

When a request for a new channel is made to either endpoint, the local endpoint (i.e. the endpoint at which the request is made) sends a CONNECT packet through the connection to the remote endpoint (i.e. the other endpoint). The CONNECT packet carries request-id and the requested channel-id.

Responding to the CONNECT packet, the remote endpoint first verifies if the requested channel-id is used in its own channel-table. If not, the remote endpoint sends a packet containing CONNECT_RESPONSE, request-id, channel-id and additional code OK.

If the requested channel-id is used, however, the remote endpoint generates a new connection-id, and responds with CONNECT_RESPONSE, request-id, the new channel-id and additional code CHANGE_ID.

Common Operations—Closing a Channel

When a request to close a channel is made to either endpoint, the local endpoint sends a DROP packet through the connection to the remote endpoint. The DROP packet consists of request-id and the channel-id of the channel to be closed. The local endpoint then closes the local channel without waiting for DROP_RESPONSE. When DROP_RESPONSE is received it may be ignored.

When an endpoint receives a DROP packet, it closes the associated channel and responds with a DROP_RESPONSE packet. The DROP_RESPONSE packet consists request-id and channel-id of the closed channel.

Managing Data Transfer—Read Queues

In each endpoint, a separate asynchronous process continuously reads packets from the incoming data stream. Read packets may then be posted on a global queue without examination, or examined and posted to a channel-specific queue. If packets are posted to the global queue, a separate process is used to read packets from the global queue and post them to channel queues.

There is no relationship between the packet size and read operation's buffer sizes. The input stream implementation manages discrepancies in the amount of data requested by the read operation and amount of data available in the packet as follows.

When a read operation is first invoked on a channel's read stream, the read stream implementation retrieves the first packet from the queue. If the queue is empty, the read operation may block (e.g. finitely or definitely wait for data to be available) or return zero length data. If the queue is not empty, the first packet's data is provided to the read operation. If there is data remaining in the packet data buffer after the read operation, the location and size of data is noted in the read stream so as to be able to resume data at the correct location.

Further read operations retrieve data from current packet's data buffer. If the current packet's buffer is consumed fully, the next packet is retrieved from the queue to become the 'current' packet. This process resumes until all data is read, the channel is closed or an error occurs.

Managing Data Transfer—Controlling Transfer Speed

If the data producer (e.g. remote endpoint's channel client) produces data at a higher rate than the data consumer (e.g. local endpoint's channel client) consumes the data, there will be an increasing amount of data in the communication system. This is manifested by an increasing number of packets in the channel's read queue.

The endpoint's multiplexing logic detects this situation by comparing the channel's packet queue size to a set of thresholds.

Consider an example with two preset thresholds. Once the number of packets in the channel's packet queue reaches a lower (SLOWDOWN) threshold the local endpoint begins to send SLOWDOWN packets to the remote endpoint. The SLOWDOWN packets are sent periodically while the number of packets in the queue is between the lower (SLOWDOWN) threshold and a higher (STOP) threshold. Once the higher threshold is exceeded, the endpoint sends a STOP command using the control channel and specifying which channel to stop. Once the number of packets in the queue returns to an acceptable value (e.g. is under the lower SLOW- DOWN threshold), the endpoint sends a RESUME command to inform remote endpoint that it is ready to receive more packets.

When an endpoint receives the SLOWDOWN command it begins temporarily blocking (i.e. waiting a certain period of time before processing) write requests for the offending channel. When an endpoint receives a STOP command, it blocks (i.e. waiting a definite or indefinite period of time) write requests until a RESUME command arrives.

Managing Data Transfer—Handling Channel Closure while Reading

In the case where a channel that is closed before data transfer is completed, that is a channel for which the data has not been fully retrieved from the buffer before a DROP command is issued, the channel is deemed closed, however its input stream is kept open until it is empty, closed or discarded.

Gateway Solution

Figure 3:
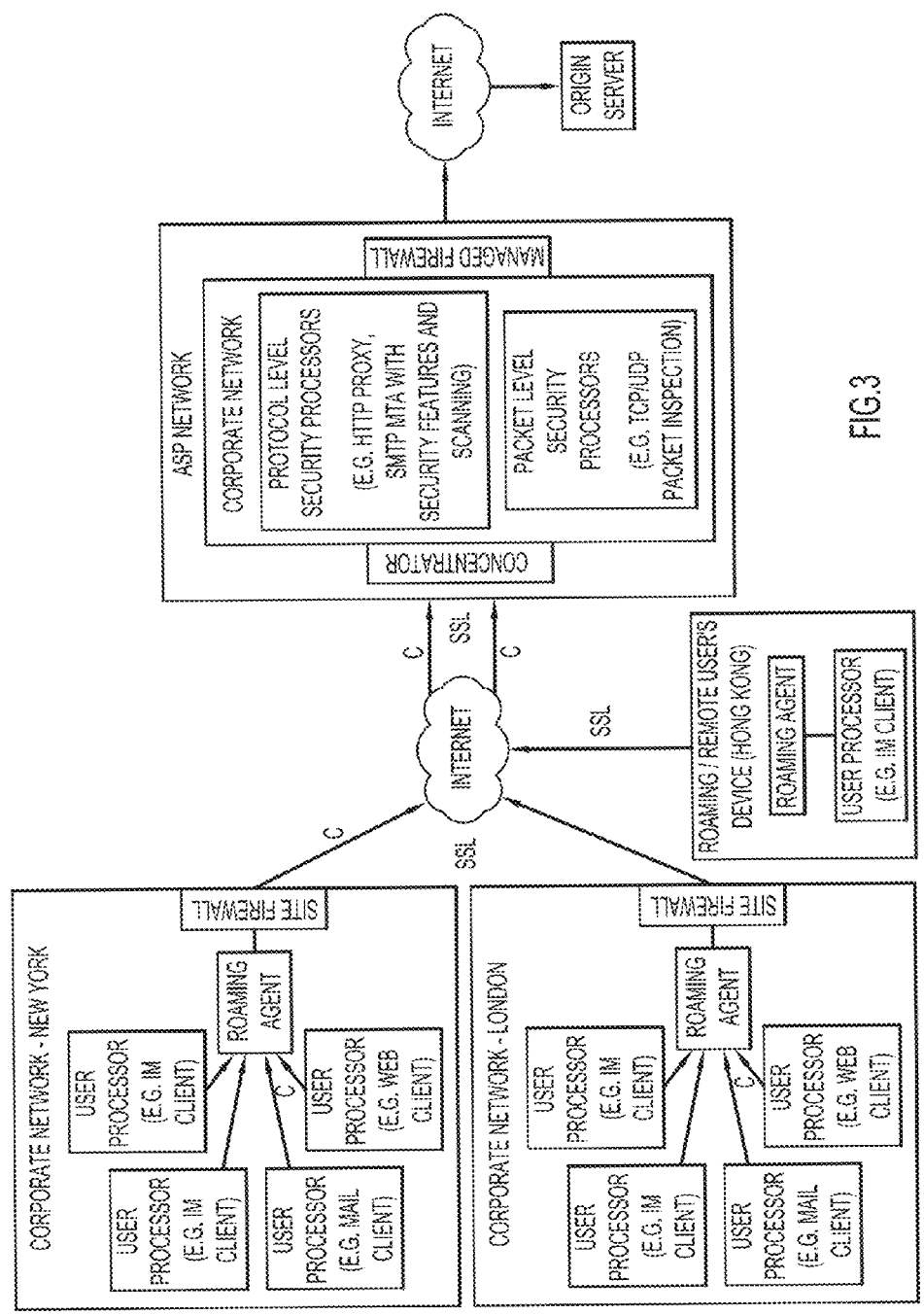
FIG. 3 is a schematic illustration of a system in accordance with another embodiment of the invention providing access to remote resources for users both within and outside a corporate network.

FIG. 3 illustrates another embodiment that uses the 'client agent' technology described above to serve as a gateway for connecting users of one or more corporate networks to a remote, managed service (optionally in addition to also connecting users outside the corporate network to the managed service as discussed above).

This approach can be used, for example, to deliver all customers internet traffic to a managed security service and therefore provide a complete firewall/security service.

The gateway deployments of the client agent (referred to as "roaming agents" in FIG. 3) may be configured to intercept or otherwise be assigned all network (e.g. TCP/UDP) traffic between the corporate network and the internet. The agent redirects this traffic to the managed service provider.

This may be done by combining all traffic into one or more data connections. The data connections may use encryption to protect corporate data while transmitting over the unsecured, open internet.

The service provider can secure the incoming and outgoing traffic.

Conveniently, and as illustrated, a single customer (e.g. a company) may deliver traffic from multiple sites. In this case this traffic may be aggregated into a single virtual network at the managed service.

The traffic may be handled, for example, at protocol level (e.g. protocol specific HTTP/SMTP/FTP handling) or at transport level (e.g. analysing data packets).

User credentials can be communicated in several ways, as discussed above. User authentication can be protocol specific authentication (e.g. with message appendices as discussed above) and/or can be based on network logon (e.g. correlating IP address in packets with network logon).

Other than the network location at which the client agent ("roaming agent") is deployed, the details of the operation of the system illustrated in FIG. 3 can be as described above in connection with the embodiment of FIGS. 1 and 2.

It will be appreciated that the embodiments described above are given by way of example only and many modifications to that which has been specifically described are possible within the scope of the present invention.

The invention claimed is:

1. A system comprising:
   a roaming computer configured to securely transmit requests to a server computer over a shared public network;
   a client agent installed on the roaming computer for creating a secure connection with the server computer and transmitting requests from the roaming computer to the server computer via the secure connection;
   the client agent operating, on initiation of the secure connection, to open a communication channel through the secure connection and designate it as a control channel, the control channel being used by the client agent to open a further one or more communication channels for transmission of requests through the secure connection;
   the client agent comprising a multiplexer component for combining data from the control channel and said one or more further communication channels into a single data stream for transmission through the secure connection;
   a server computer connected to the roaming computer via the public network;
   a server component installed on the server computer for receiving requests from the client agent sent via the secure connection, wherein the server component comprises a de-multiplexer component for receiving a multiplexed data stream from the roaming computer sent via the secure connection and separating the de multiplexing the signal to recreate the distinct control channel and one or more further communications channels carrying the requests from the roaming computer.

2. The system of claim 1, wherein the multiplexed communication through the secure connection is bi-directional, and both the client agent and server component comprise multiplexer and de-multiplexer components.

3. The system of claim 1, wherein the control channel remains open throughout a session.

4. The system of claim 1, wherein the control channel is used by both the client agent or the server component to open and close communication channels and to manage the data transfer.

5. The system of claim 1, wherein the control channel is used for controlling the transfer speed of data through a communication channel.

6. The system of claim 1, wherein in the case where the client agent of server component request that a communication channel is closed before data transmission is complete, the channel is kept open until transmission is complete and then closed.

7. A method for securely communicating requests between a roaming computer and a server computer over a shared public network, the roaming computer having a client agent installed thereon and the server computer having a server component installed thereon that comprises a de-multiplexer component, the method comprising:
   the client agent creating a secure connection with the server computer;
   the client agent, on initiation of the secure connection, opening a communication channel through the secure connection and designating it as a control channel;
   the client agent, using the control channel, opening a further one or more communication channels for transmission of requests through the secure connection;
   the client agent multiplexing data from the control channel and said one or more further communication channels into a single data stream for transmission through the secure connection;
   the client agent transmitting the single data stream to the server computer via the secure connection;
   the server component receiving the single data channel sent from the roaming computer sent via the secure connection; and
   the server component de-multiplexing the single data stream to recreate the distinct control channel and the one or more further communications channels carrying the requests from the roaming computer.

8. The method of claim 7, wherein opening a further one or more communication channels for transmission of requests through the secure connection comprises:
opening a bi-directional channel, wherein both the client agent and server component comprising multiplexer and de-multiplexer components.

9. The method of claim 7, further comprising:
maintaining the control channel in an open state throughout a session.

10. The method of claim 7, further comprising:
opening communication channels, by the client agent or the server component, with the control channel; and
closing communication channels, by the client agent or the server component, with the control channel.

11. The method of claim 7, further comprising:
controlling, with the control channel, the transfer speed of data through a communication channel.

12. The method of claim 7, wherein in the case where the client agent of server component requests that a communication channel is closed before data transmission is complete, further comprising:
maintaining the channel in an open state until transmission is complete.

13. One or more non-transitory computer readable storage devices encoded with software comprising computer executable instructions and when the software is executed operable to:
create a secure connection between a roaming computer and a server computer;
transmit requests from the roaming computer to the server computer via the secure connection;
following initiation of the secure connection, open a communication channel through the secure connection and designate the communication channel as a control channel for use in opening a further one or more communication channels for transmission of requests through the secure connection;
cause a multiplexer component to combine data from the control channel and said one or more further communication channels into a single data stream for transmission through the secure connection;
receive the single data channel sent from the roaming computer sent via the secure connection; and
de-multiplex the single data stream to recreate the distinct control channel and the one or more further communications channels carrying the requests from the roaming computer.

14. The non-transitory computer readable storage media of claim 13, wherein the instructions operable to open a further one or more communication channels for transmission of requests through the secure connection comprise instructions operable to:
open a bi-directional channel, wherein both a client agent on the roaming computer and a server component on the server computer comprise multiplexer and de-multiplexer components.

15. The non-transitory computer readable storage media of claim 13, further comprising instructions operable to:
maintain the control channel in an open state throughout a session.

16. The non-transitory computer readable storage media of claim 13, further comprising instructions operable to:
open communication channels with the control channel; and
close communication channels with the control channel.

17. The non-transitory computer readable storage media of claim 13, further comprising instructions operable to:
control, via the control channel, the transfer speed of data through a communication channel.

18. The non-transitory computer readable storage media of claim 13, further comprising instructions operable to:
when a server component on the server computer requests that a communication channel is closed before data transmission is complete, maintain the channel in an open state until transmission is complete.

* * * * *